United States Patent
Xu et al.

(10) Patent No.: US 11,438,595 B2
(45) Date of Patent: Sep. 6, 2022

(54) VIDEO CODING METHOD AND SYSTEM USING A SCAN REGION BASED COEFFICIENT CODING

(71) Applicant: Tencent America LLC, Palo Alto, CA (US)

(72) Inventors: Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 76 days.

(21) Appl. No.: 17/082,371

(22) Filed: Oct. 28, 2020

(65) Prior Publication Data

US 2021/0168368 A1 Jun. 3, 2021

Related U.S. Application Data

(60) Provisional application No. 62/941,994, filed on Nov. 29, 2019.

(51) Int. Cl.
*H04N 19/176* (2014.01)
*H04N 19/129* (2014.01)
*H04N 19/50* (2014.01)
*H04N 19/172* (2014.01)
*H04N 19/18* (2014.01)

(52) U.S. Cl.
CPC ......... *H04N 19/129* (2014.11); *H04N 19/172* (2014.11); *H04N 19/176* (2014.11); *H04N 19/50* (2014.11)

(58) Field of Classification Search
None
See application file for complete search history.

(56) References Cited

U.S. PATENT DOCUMENTS

2021/0274196 A1* 9/2021 LeLeannec ............ H04N 19/70

OTHER PUBLICATIONS

Fan Wang et al., AVS work group document AVS-M4763, Jun. 2019, Chengdu, China. 5 pages.

* cited by examiner

*Primary Examiner* — Alison Slater
(74) *Attorney, Agent, or Firm* — Anova Law Group, PLLC

(57) ABSTRACT

A video encoding method includes obtaining a current frame of a video input; dividing the obtained current frame into a plurality of blocks; obtaining a residual block for each of the plurality of blocks; performing scan region based coefficient coding (SRCC) to the residual block, wherein a size of a scan region of a current block is predicted based on the sizes of the scan regions of previously coded blocks, such that coding efficiency and compression performance are improved; and coding the current frame to generate a bitstream including the coded residual block for each of the plurality of blocks of the current frame.

20 Claims, 7 Drawing Sheets

VIDEO CODING METHOD AND SYSTEM USING A SCAN REGION BASED COEFFICIENT CODING

RELATED APPLICATIONS

This application claims priority to U.S. provisional patent application No. 62/941,994, filed on Nov. 29, 2019, content of which is incorporated by reference in its entirety.

FIELD OF THE TECHNOLOGY

This application relates to the field of video coding technologies and, specifically, to a method and system of video coding with scan region based coefficient coding (SRCC).

BACKGROUND OF THE DISCLOSURE

The video coding scheme of the audio and video coding standard (AVS) of China includes a residue coding method called scan region based coefficient coding (SRCC). Within a transform block, a scan region is labeled such that non-zero coefficients only exist inside the labeled scan region and zero coefficients occupy any positions outside the labeled scan region. Because the non-zero coefficients only exist inside the scan region, the SRCC method encodes the non-zero coefficients only within the scan region rather than the entire transform block. Thus, the coding efficiency and compression performance may be improved. However, in the existing SRCC method, labeling the scan region often does not consider the scan regions of previously coded transform blocks. A method of predicting the scan region of a current transform block based on the scan regions of previously coded transform blocks is provided to reduce the overhead for signaling the scan region from a video encoder to a video decoder, employing the SRCC method.

SUMMARY

One aspect of the present disclosure includes a video encoding method. The method includes: obtaining a current frame of a video input; dividing the obtained current frame into a plurality of blocks; obtaining a residual block for each of the plurality of blocks; performing scan region based coefficient coding (SRCC) to the residual block, wherein a size of a scan region of a current block is predicted based on the sizes of the scan regions of previously coded blocks, such that coding efficiency and compression performance are improved; and coding the current frame to generate a bitstream including the coded residual block for each of the plurality of blocks of the current frame.

Another aspect of the present disclosure includes a video decoding method. The method includes: obtaining a bitstream including a plurality of coded frames of a video signal; decoding each of the plurality of coded frames into a plurality of coded coding tree units (CTUs) and each of the plurality of coded CTUs into a plurality of coded residual blocks; decoding each of the plurality of coded residual blocks by reversing scan region based coefficient coding (SRCC), wherein a size of a scan region of a current block is predicted based on sizes of scan regions of previously coded blocks; recovering the current block for each of the plurality of decoded residual blocks; reconstructing each frame of the video signal by storing the recovered block for each of the plurality of decoded residual blocks in a frame buffer; and continuously outputting the reconstructed frames to restore the video signal.

Other aspects of the present disclosure can be understood by those skilled in the art in light of the description, the claims, and the drawings of the present disclosure.

DETAILED DESCRIPTION

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure. Certain terms used in this disclosure are first explained in the followings.

Audio video coding standard (AVS): AVS is a series digital audio and digital video compression standards formulated by Audio and Video standard workgroup of China. The latest revision is AVS3. AVS3 standard is incorporated herein by reference.

Scan region based coefficient coding (SRCC): SRCC is a video coding method that performs residue coding in a scan region labeled within a transform block. SRCC is supported in AVS3 standard.

Coding tree unit (CTU): CTU is a basic processing unit of various video coding schemes of AVS standard. A video frame is divided into a plurality of CTUs and each CTU is further divided into various smaller units (e.g., coding unit or CU) or blocks for effective video coding.

Context-based Adaptive Binary Arithmetic Coding (CABAC): CABAC is a form of entropy coding used in various video coding standards.

Two-step cross-component prediction mode (TSCPM): TSCPM reduces the cross-component redundancy between the chroma and luma by predicting from previously decoded luma samples.

Ultimate motion vector expression (UMVE): UMVE is a motion vector offset compensation method to refine the motion vector of skip/direction mode for better prediction.

History based motion vector prediction (HMVP): HMVP uses motion information of more previously coded blocks.

Adaptive motion vector resolution (AMVR): AMVR supports an enhanced motion vector resolution (EMVR) mode for motion vector prediction coding.

Figure 1:
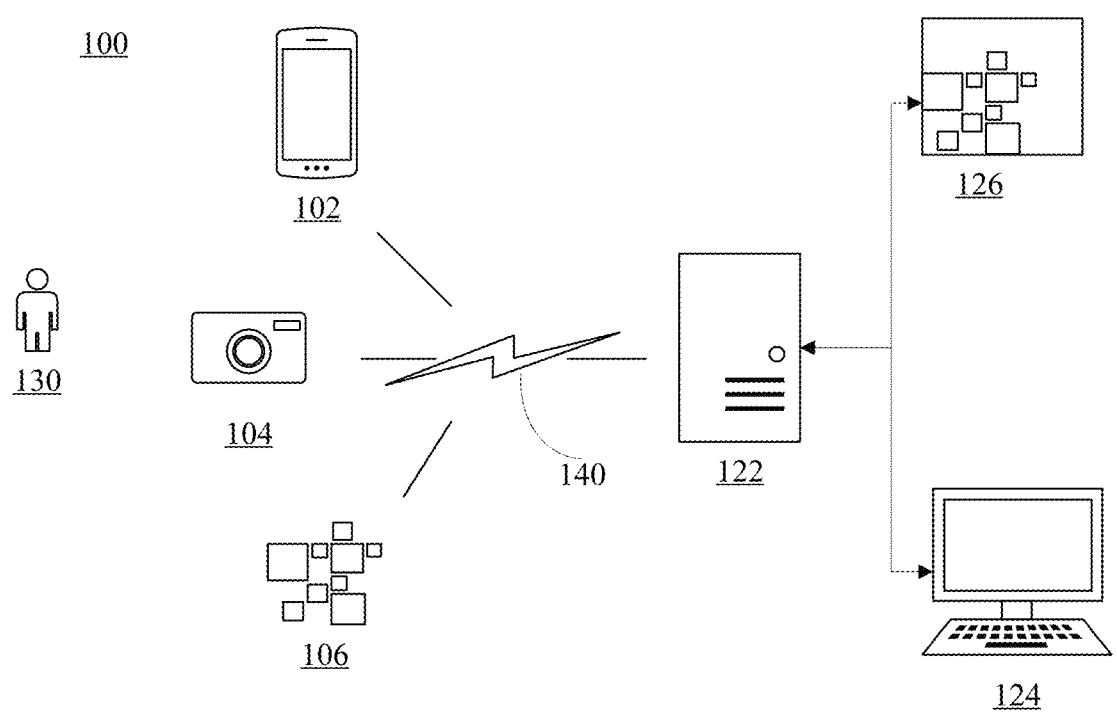
FIG. 1 illustrates an operating environment incorporating certain embodiments of the present disclosure.

FIG. 1 shows an operating environment 100 incorporating certain embodiments of the present disclosure. As shown in FIG. 1, the operating environment 100 may include a variety of devices with video functionalities. For example, the operating environment 100 may include a terminal device 102, a camera device 104, and an internet of things (IoT) device 106. Other types of devices may also be included.

The operating environment 100 may also include a server 122, a human vision application 124, a machine vision application 126, and a communication link 140 connecting the variety of devices to the server 122. A user 130 may use, access, or control one or more of the variety of devices.

The terminal device 102 may include any user terminal, such as a personal digital assistant (PDA), a mobile phone, a smart phone, an integrated messaging device (IMD), a tablet computer, a notebook computer, a desktop computer, and other computing devices. The camera device 104 may include any image or video capturing devices, such as a digital camera, a video camera, a security camera, a vehicle on-board camera, and a stereo camera, etc. The IoT device 106 may include any type of IoT device with a camera function, such as a digital doorbell, an autonomous driving sensor, a digital voice assistant, a smart speaker, a smart appliance, and any industrial or commercial IoT systems. Any of the variety of devices 102, 104, and 106 may be stationary or mobile when carried by an individual who is moving, and may also be located as a part or in a mode of transport including a car, a truck, a taxi, a bus, a train, a boat, an airplane, a bicycle, a motorcycle or any similar suitable mode of transport.

Figure 2:
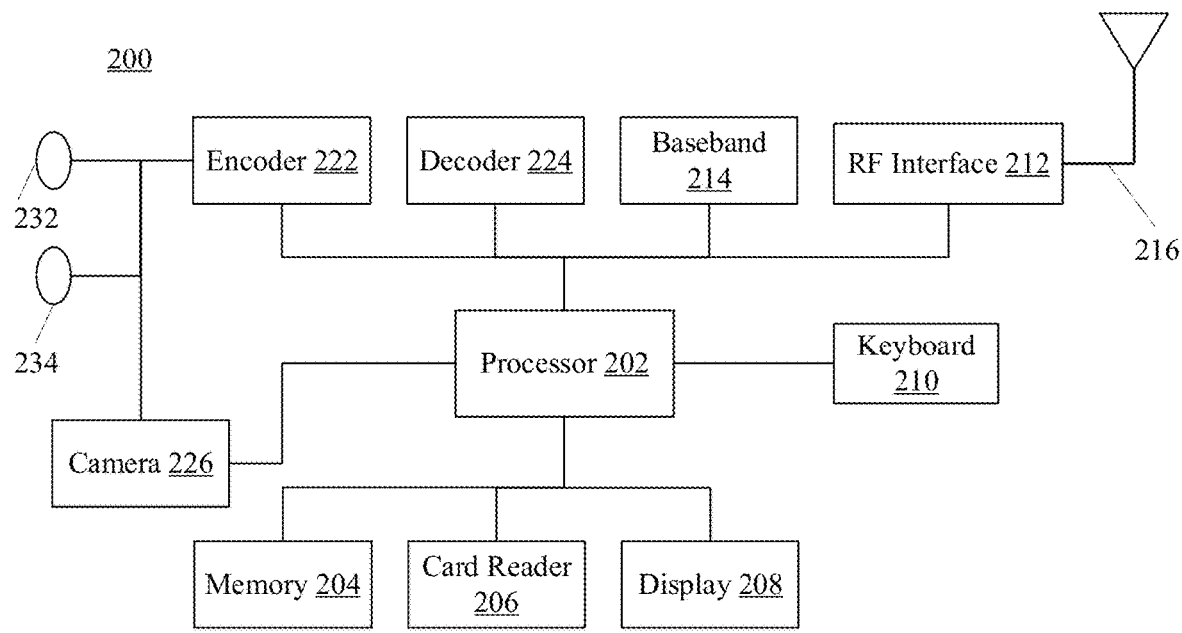
FIG. 2 illustrates an electronic device consistent with embodiments of the present disclosure.

FIG. 2 shows an electronic device for implementing any of the variety of devices 102, 104, and/or 106. As shown in FIG. 2, the electronic device 200 may include a hardware processor 202, a memory 204, a card reader 206, a display 208, a keyboard 210, a radio-frequency (RF) interface 212, a baseband 214, an antenna 216, an encoder 222, a decoder 224, a camera 226, a speaker 232, and a microphone 234, etc. The components shown in FIG. 2 are illustrative, certain components may be omitted, and other components may be added.

The processor 202 may be provided for controlling the electronic device 200. The processor 202 may be connected to other components through one or more bus or other electrical connections to send data to and receive data from the other components. The processor 202 may include one or more processing cores, for example, a 4-core processor or an 8-core processor. The processor 202 may be implemented by using at least one hardware form of digital signal processing (DSP), a field-programmable gate array (FPGA), an application specific integrated circuit (ASIC), and a programmable logic array (PLA). The processor 202 may also include a main processor and a coprocessor. The main processor may be a central processing unit (CPU), and the coprocessor may be a graphics processing unit (GPU) configured to be responsible for rendering and drawing content that a display screen needs to display. In some embodiments, the processor 202 may further include an artificial intelligence (AI) processor. The AI processor is configured to process a computing operation related to machine learning.

The memory 204 may include one or more computer-readable storage media, such as a high-speed random access memory and a nonvolatile memory, for example, one or more disk storage devices or flash storage devices. The memory 204 may store both data in the form of image and audio data and may also store instructions for the processor 202. The card reader 206 may include any type of portable card interface, such as a smart card interface, a communication card interface (e.g., near field communication (NFC) card), or a subscriber identifier module (SIM) card or other card interface for providing user information and being suitable for providing authentication information for authentication and authorization of the user 130.

Further, the display 208 may be any suitable display technology suitable to display an image or video. For example, the display 208 may include a liquid crystal display (LCD) screen, an organic light-emitting diode (OLED) screen, or the like, and may be a touch screen. The keyboard 210 may include a physical or virtual keyboard to input information by the user 130, and may also include other types of input/output devices. The speaker 232 and the microphone 234 may be used to input and output audio for the electronic device 200.

The RF interface 212 (together with the antenna 216) may include RF circuitry for receiving and transmit RF signals. The RF interface 212 may convert an electrical signal to an electromagnetic signal for transmission or convert a received electromagnetic signal into an electrical signal for receiving. The RF interface 212 may communicate with other electronic devices through at least one wireless communication protocol. The wireless communication protocol may include a metropolitan area network, mobile communications networks (2G, 3G, 4G, and 5G) of various generations, a wireless local area network (LAN), and/or a wireless fidelity (WiFi) network. In some embodiments, the RF interface 212 may also include a circuit related to near field communication (NFC). The baseband 214 may include circuitry for processing the signals to and from the RF interface 212.

Further, the camera 226 may include any type of imaging or video capturing device configured to collect an image or a video. When the electronic device 200 is a portable device carried by the user 130, the camera 226 may include a front-facing camera and a rear-facing camera. The front-facing camera may be disposed on the front panel of the electronic device, and the rear-facing camera is disposed on a rear surface of the electronic device. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera 226 may further include a flash.

The encoder 222 and the decoder 224 may be referred as the codec circuitry of the electronic device suitable for carrying out coding and decoding of audio and/or video data or assisting in coding and decoding carried out by the processor 202.

The electronic device 200 as shown in FIG. 2 may include structures similar to those of a mobile terminal or user equipment of a wireless communication system. However, any electronic device or apparatus which may require encoding and decoding, or encoding or decoding video or images may be included.

Returning to FIG. 1, the electronic device 200 (i.e., any one or more of the variety of devices 102, 104, and/or 106) may capture or collect various data (e.g., audio data, environment/operating data, image data, and/or video data) and send the data to the server 122 through the communication link 140. The electronic device 200 may process or pre-process the data before sending the data to the server 122, or may send the unprocessed data to the server 122.

The communication link 140 may include any appropriate type of communication network and may comprise any combination of wired or wireless networks including, but not limited to a wireless cellular telephone network, a wireless local area network (WLAN), a Bluetooth personal area network, an Ethernet local area network, a token ring local area network, a wide area network, and the Internet. The communication link 140 may also include private or public cloud computing platform for voice/data communication. When the Internet or other type of network is included, connectivity to the Internet may include long range wireless connections, short range wireless connections, and various wired connections including telephone lines, cable lines, power lines, and similar communication pathways.

Figure 3:
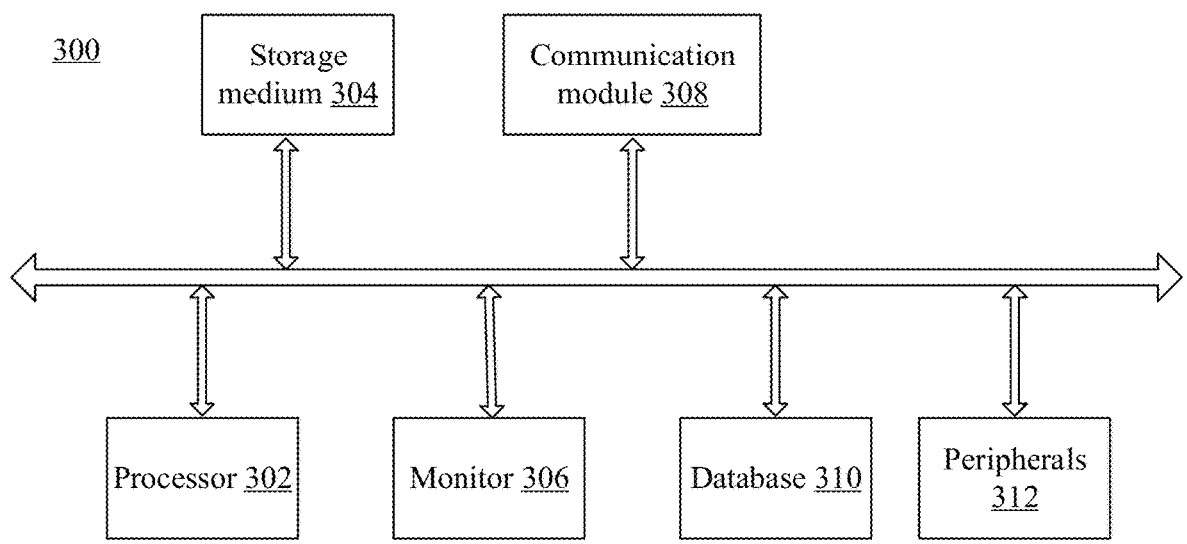
FIG. 3 illustrates a computer system consistent with embodiments of the present disclosure.

The server 122 may include any type of server computer system or multiple computer systems configured in a server cluster or distributed in different locations. The server 122 may also include a cloud server on a cloud computing platform. FIG. 3 illustrates an exemplary computer system implementing certain aspects of server 122.

As shown in FIG. 3, the computer system 300 may include a processor 302, storage medium 304, a monitor 306, a communication module 308, a database 310, and peripherals 312. Certain devices may be omitted and other devices may be included.

Processor 302 may include any appropriate processor or processors. Further, processor 302 can include multiple cores for multi-thread or parallel processing. Storage medium 304 may include memory modules, such as Read-only Memory (ROM), Random Access Memory (RAM), flash memory modules, erasable and rewritable memory, and mass storages, such as CD-ROM, U-disk, and hard disk, etc. Storage medium 304 may store computer programs for implementing various processes, when executed by processor 302.

Further, the peripherals 312 may include I/O devices such as a keyboard and a mouse. The communication module 308 may include network devices for establishing connections through the communication network. The database 310 may include one or more databases for storing certain data and for performing certain operations on the stored data, such as database searching.

Returning to FIG. 2, the encoder 222 may be an encoder implementing a method of intra mode coding. In this case, the electronic device 200 may also be considered to implement the method of intra mode coding. That is, the encoder 222 may be implemented as a hardware circuitry in the electronic device 200, or may be implemented as a software program by the electronic device 200, or a combination of the hardware circuitry and the software program.

Figure 4:
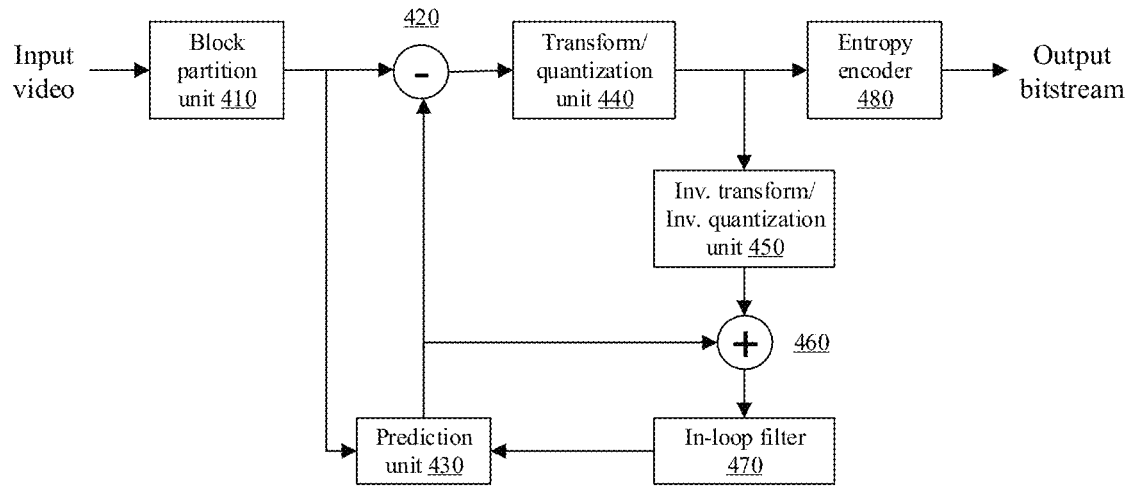
FIG. 4 illustrates a video encoder consistent with embodiments of the present disclosure.

FIG. 4 illustrates an exemplary video encoder consistent with the disclosed embodiments of the present disclosure. As shown in FIG. 4, the video encoder 400 includes a block partition unit 410, a subtraction unit 420, a prediction unit 430, a transform/quantization unit 440, an inverse quantization/inverse transform unit 450, an addition unit 460, an in-loop filter 470, and an entropy encoder 480. An input video is inputted into the video encoder 400 and in response, the video encoder 400 outputs a bitstream.

The input video includes a plurality of picture frames. Each picture frame is divided into a sequence of coding tree units (CTUs) by the block partition unit 410. For a picture frame that has three sample arrays, a CTU consists of an N×N block of luma samples together with two corresponding M×M blocks of chroma samples. The block partition unit 410 further splits the CTU into coding units (CUs) by using a nested multi-type tree using binary and ternary splits structure denoted as coding tree to adapt to various local characteristics. The decision whether to code a picture area using inter-picture (temporal) or intra-picture (spatial) prediction is made at a leaf CU level of the coding tree. Prediction process is applied to the leaf CU to obtain a residual block, transformation may be applied to the residual block, and the relevant information is transmitted to a corresponding decoder on a CU basis. After obtaining a residual block by applying the prediction process, a leaf CU can be partitioned into transform units (TUs) by another tree structure for residual coding with or without transformation.

The prediction unit 430 supports intra prediction, inter prediction, and combined inter and intra prediction. The intra prediction is also called intra mode coding. To capture the arbitrary edge directions presented in a natural video, the prediction unit 430 supports directional (or angular) intra-prediction modes in addition to planar (surface fitting) intra-prediction mode and DC (flat) intra-prediction mode. The prediction unit 430 further supports a two-step cross-component prediction mode (TSCPM) to reduce the cross-component redundancy between the chroma and luma by predicting from previously decoded luma samples. The prediction unit 430 further supports a motion vector offset compensation method, called ultimate motion vector expression (UMVE), to refine the motion vector of skip/direction mode for better prediction, and a history based motion vector prediction (HMVP) method by using motion information of more previously coded blocks. To reduce the coding bits of motion vector difference, the prediction unit 430 uses a CU level adaptive motion vector resolution (AMVR) scheme to support an enhanced motion vector resolution (EMVR) mode for motion vector prediction coding.

The subtraction unit 420 outputs a difference (or a residual) between a coding unit and a prediction unit to the transform/quantization unit 440.

The transform/quantization unit 440 supports large block-size transforms up to 64×64 in size. High frequency transform coefficients are zeroed out for the transform blocks with size equal to 64, so that only the lower-frequency coefficients are retained. When transforming a large block in the skip mode, the transform/quantization unit 440 uses the entire block without zeroing out any values. The transform/quantization unit 440 supports discrete cosine transforms type VIII (DCT-VIII) and discrete sine transforms type VII (DST-VII) to achieve better energy compaction. The transform/quantization unit 440 uses a position based transform (PBT) method to select different transform cores according to positions of blocks in a quad-tree partition.

Context-based Adaptive Binary Arithmetic Coding (CABAC) may be described as the entropy coding algorithm. The entropy encoder 480 includes a CABAC coding engine to encode syntax elements outputted by the transform/quantization unit 440. The CABAC coding engine supports arithmetic coding algorithms such as Golomb-Rice coding algorithm. The entropy encoder 480 supports separate residual coding structures for a transform block and a transform skip block. In the arithmetic coding algorithm, a probability model is dynamically selected for each syntax element depending on previously coded information in a local neighborhood.

The inverse quantization/inverse transform unit 450 reverses the quantization process and the transform process performed by the transform/quantization unit 440 and feeds an output to the addition unit 460 to reconstruct the picture frame. The addition unit 460 also takes the output of the prediction unit 430 as another input. The reconstructed picture will be filtered by the in-loop filter 470. The in-loop filter 470 includes a deblocking filter, a sample adaptive offset (SAO) filter, and an adaptive loop filter (ALF), which are cascaded in this order. The output of the in-loop filter 470 is inputted into the prediction unit 430.

Figure 5:
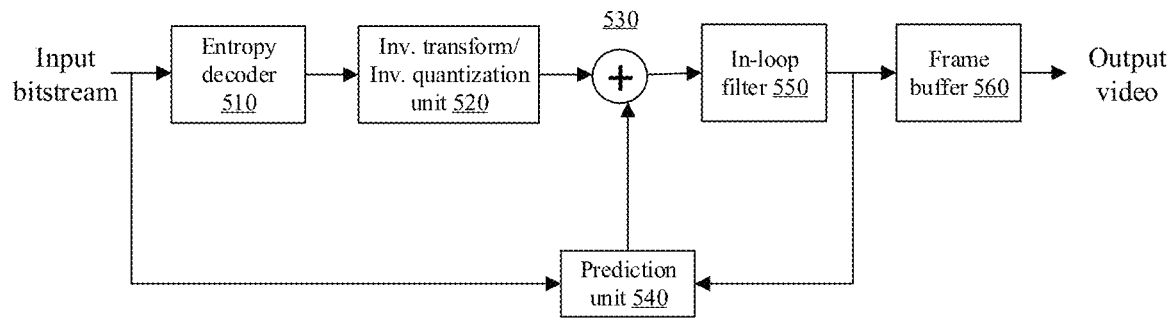
FIG. 5 illustrates a video decoder consistent with embodiments of the present disclosure.

FIG. 5 illustrates a video decoder consistent with embodiments of the present disclosure. As shown in FIG. 5, the video decoder 500 includes an entropy decoder 510, an inverse transform/inverse quantization unit 520, an addition unit 530, a prediction unit 540, an in-loop-filter 550, and a frame buffer 560. An input bitstream outputted from the video encoder 400 shown in FIG. 4 is inputted into the video decoder 500 and in response, the video decoder 500 outputs a video signal. The input bitstream may be transmitted over a communication network or stored in a storage device before being inputted into the video decoder 500.

The video decoder 500 performs a video decoding process to the input bitstream to reconstruct the picture frames. The video decoding process is a process reversing the video encoding process performed by the video encoder 400. Specifically, the entropy decoder 510 decodes the bitstream encoded by the entropy encoder 480. The inverse transform/inverse quantization unit 520 reverses the transform/quantization process performed by the transform/quantization unit 440 to recover the residual block. The addition unit 530 calculates the sum of the residual block and the predicted block predicted by the prediction unit 540 to recover the coding block. The in-loop filter 550 smooths the recovered coding block. Finally, the coding block is stored into the frame buffer 560 to reconstruct the picture frame.

In the meantime, the prediction unit 540 takes the decoded coding block and various flags in the input bitstream as the inputs to generate the predicted block.

Figure 6:
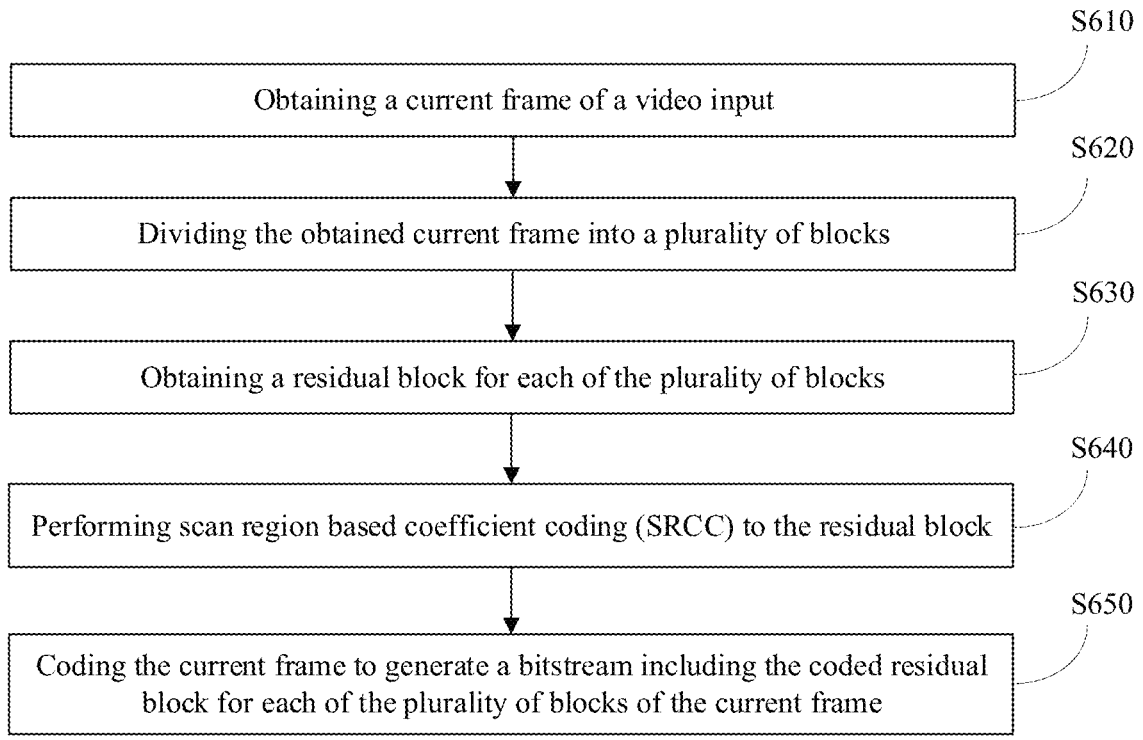
FIG. 6 illustrates an exemplary video encoding method consistent with embodiments of the present disclosure.

The present disclosure provides a video encoding method. FIG. 6 illustrates a flowchart of an exemplary video encoding method consistent with embodiments of the present disclosure. As shown in FIG. 6, the video encoding method includes obtaining a current frame of a video input (at S610). After the current frame of the video input is obtained, the current frame may be divided into a plurality of coding tree units (CTUs) according to a nested multi-type tree coding block structure. Each of the plurality of CTUs may be further split into coding units (CUs), and each CU may be further split into prediction units (PUs), transform units (TUs), and coding blocks (CBs).

At S620, the obtained current frame is divided into a plurality of blocks. In various video coding schemes, the current frame may be divided into various smaller units, blocks, and sub-blocks according to various partition rules. The term block may refer to the coding block.

At S630, after the current frame is divided into the plurality of blocks, a residual block is obtained for each of the plurality of blocks. Specifically, a predicted block may be obtained for a current block through intra prediction, inter prediction, or a combination of both the intra prediction and the inter prediction. A difference between the current block and the predicted block may be calculated to obtain the residual block.

At S640, scan region based coefficient coding (SRCC) is performed to the obtained residual block. Specifically, after the residual block is obtained, the residual block may be transformed, quantized, and entropy coded.

In the video coding scheme of AVS3 standard, a residue coding technique called SRCC is used to code the residual block. In SRCC, a scan region (sometimes also called SRCC region) is determined inside a transform block, such that non-zero coefficients are only located inside the scan region and the portion of the transform ock outside the scan region only includes zero coefficients.

Figure 7:
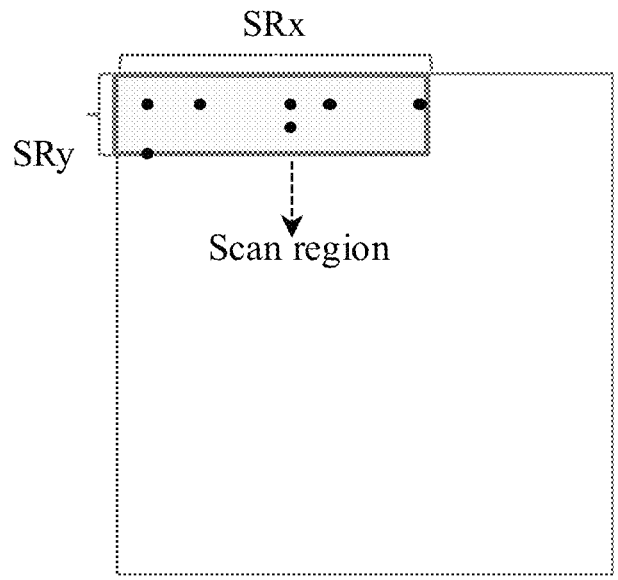
FIG. 7 illustrates an exemplary scan region inside a transform block consistent with embodiments of the present disclosure.

FIG. 7 illustrates an exemplary scan region inside a transform block consistent with embodiments of the present disclosure. As shown in FIG. 7, the upper-left corner of the scan region coincides with the upper-left corner of the corresponding block. The block is a rectangular region within a current frame and has a width W and a height H, where W and H are positive integers. The scan region has a width SRx and a height SRy, where SRx is an integer between 1 and W of the corresponding block and SRy is an integer between 1 and H of the corresponding block. The size of the scan region defined by SRx and SRy for each previously coded block is stored and identified by an index number, where the index number is an integer greater than or equal to 0.

The size of the scan region is coded in a prefix and a suffix. The prefix determines the range of the size. A truncated unary code, capped by e value of block size, may be used to signal the prefix. Based on the prefix, the suffix is signaled to indicate which of the values in the given range is selected. A fix-length code may be used to signal the suffix.

Typically, non-zero signals are randomly distributed in the residual block. After the residual block is transformed, the energy of the residual block will be represented by transform coefficients in a transform block. Low frequency coefficients with large magnitudes are often located at the top-left part of the transform block while high frequency coefficients with small magnitudes are located at the bottom-right part of the transfo in block. Then, the transform block is quantized. The bottom-right part of the transform block is likely to be filled with zero coefficients. Signaling the bottom-right part of the transform block with zero coefficients one by one is inefficient, To avoid the inefficiency, SRCC may be used to reduce the transform block to a scan region filled with non-zero coefficients within the transform block.

Figure 8:
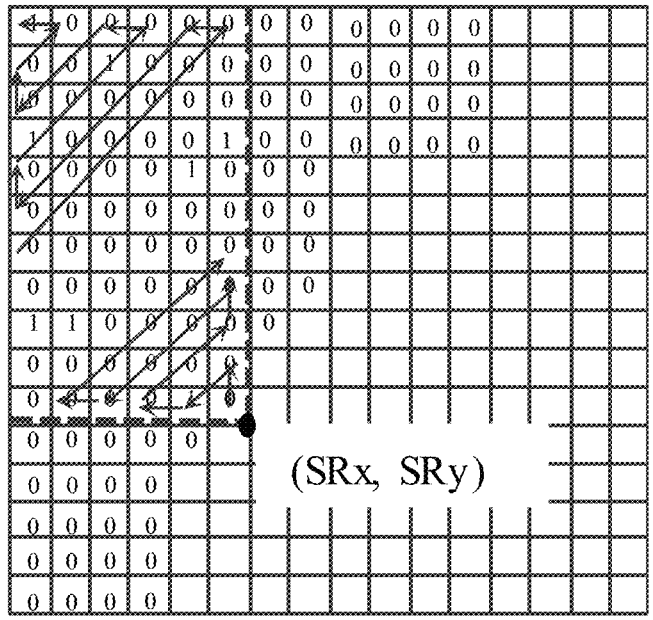
FIG. 8 illustrates an exemplary scan order inside the scan region consistent with embodiments of the present disclosure.

FIG. 8 illustrates an exemplary scan order inside the scan region consistent with embodiments of the present disclosure. As shown in FIG. 8, the coefficients inside the scan region are scanned in a reverse zig-zag order to code positions of the coefficients.

Figure 9:
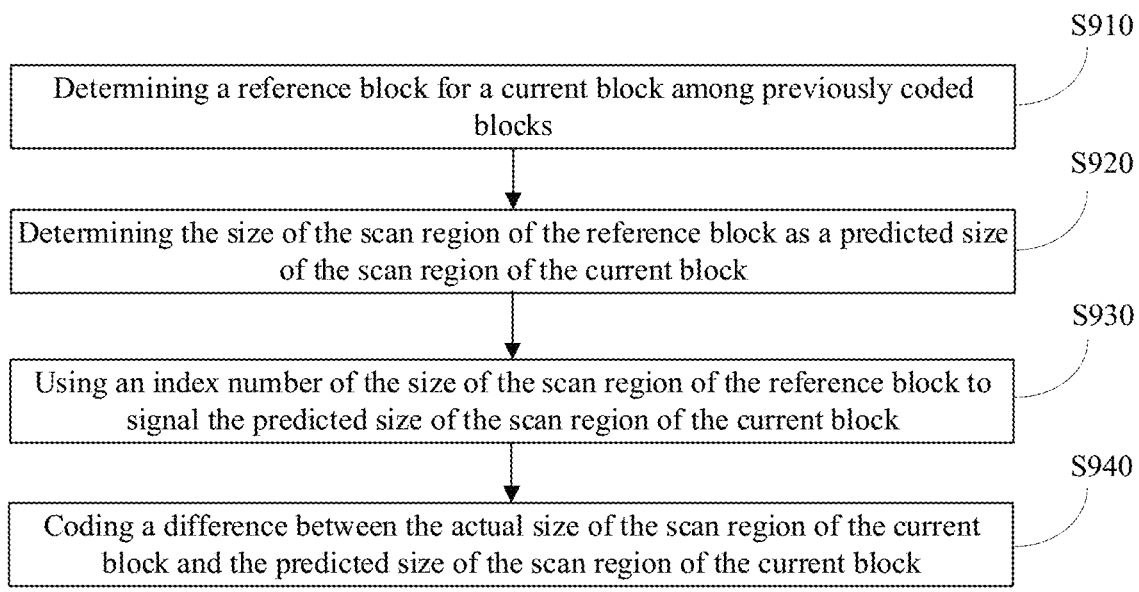
FIG. 9 illustrates an exemplary method of predicting a size of a scan region of a current block consistent with embodiments of the present disclosure.

For illustration purpose, a computer program pseudo code is included below as an example of coding SRx (scan_region_x) and SRy (scan_region_y). "width" is the block width and "height" is the block height. min_in_group={0, 1,1,2,3,4,6,8,12,16,24,32,48,64,96}. group_idx={0,1,2,3,4, 4,5,5,6,6,6,6,7,7,7,7,8,8,8,8,8,8,8,8,9,9,9,9,9,9,9,10,10,10, 10,10,10,10, 10,10,10,10,10,10,10,10,10,11,11,11,11,11,11, 11,11,11,11,11,11,11,11,11,11}.

tmp_x is parsed by using unary code, with its max val being g_group_idx[width-1]-1.
    set tmp equal to 0, if tmp_x>3, cnt=(tmp_x-2)>>1,
    for (i=cnt-1; i>=0; i--)
    {tmp+=last<<i;}
    tmp_x=min_in_group[tmp_x]+tmp
    scan_region_x is set equal to tmp_x
    tmp_y is parsed by using unary code, with its max_val being g_group_idx[height-1]-1,
    set tmp equal to 0, if tmp_y>3, cnt=(tmp_x-2)>>1,
    for (i=cnt-1; i>=0; i--)
    {tmp+=last<<i;}
    tmp_y=min_in_group[tmp_y]+tmp
    scan_region_y is set equal to tmp_y The present disclosure provides a method of predicting the size of the scan region based on the sizes of previously coded scan regions arranged in a decoding order. FIG. 9 illustrates an exemplary method of predicting a size of a scan region of a current block consistent with embodiments of the present disclosure. As shown in FIG. 9, the method includes determining a reference block for a current block among previously coded blocks (at S910). The reference block may be the most recently coded block. The reference block may be the most recently coded block having a same area as the current block. The reference block may be the most recently coded block having a same width and a same height as the current block. The reference block may be the most recently coded block that falls into a same pre-defined category as the current block. The pre-defined category may include the blocks having the aera within a certain range. The reference block may be one of the neighboring blocks adjacent to the current block.

At S920, the size of the scan region of the reference block is determined to be a predicted size of the scan region of the current block. Specifically, after the reference block is determined, the size of the scan region of the reference block becomes the predicted size of the scan region of the current block.

In one embodiment, the predicted size of the scan region of the current block may be determined by averaging the sizes of the scan regions for a pre-defined number of previously coded blocks preceding the current block, and determining the averaged size as the predicted size of the scan region of the current block.

In another embodiment, the predicted size of the scan region of the current block may be a most used size of the scan region among the pre-defined number of previously coded blocks preceding the current block, and determining the most used size as the predicted size of the scan region of the current block.

At S930, an index number of the scan region of the reference block is used to signal the predicted size of the scan region of the current block. After the size of the scan region of the reference block is determined to be the predicted size of the scan region of the current block, the size of the scan region of the reference block is stored in a table and assigned with an index number for easy retrieval of the sizes of the scan regions. The table blow is an example of the index number table of the sizes of the scan regions.

| Index | SRx | SRy |
|-------|-----|-----|
| 0 | 1 | 1 |
| 1 | 2 | 3 |
| 2 | 4 | 4 |
| 3 | 8 | 8 |
| ... | ... | ... |

In the above example, the sizes of the scan regions increase as the index number increases. However, in real life video coding systems, a new size of the scan region may be inserted into the index number table after the new size of the scan region is determined. As a result, the index numbers are associated with the sizes of the scan regions according to the determination time. Using the index number instead of the actual values of SRx and SRy reduces the number of bits in signaling.

At S940, a difference between the actual size of the scan region of the current block and the predicted size of the scan region of the current block is coded. Specifically, when the predicted size of the scan region of the current block is limited to no more than the actual size of the scan region of the current block, coding the difference between the actual size of the scan region of the current block and the predicted size of the scan region of the current block includes: coding a difference between the actual width of the scan region of the current block and the predicted width of the scan region of the current block, and coding a difference between the actual height of the scan region of the current block and the predicted height of the scan region of the current block.

When the predicted size of the scan region of the current block is not limited to no more than the actual size of the scan region of the current block, coding the difference between the actual size of the scan region of the current block and the predicted size of the scan region of the current block includes: coding a width sign flag and an absolute difference between the actual width of the scan region of the current block and the predicted width of the scan region of the current block, and coding a height sign flag and an absolute difference between the actual height of the scan region of the current block and the predicted height of the scan region of the current block.

In one embodiment, the plurality of blocks may include luma blocks and chroma blocks. The size of the scan region of a current luma block is predicted based on the sizes of the scan regions of previously coded luma blocks, and the size of the scan region of a current chroma block is predicted based on the sizes of the scan regions of previously coded chroma blocks.

In one embodiment, whether the size of the scan region is coded with or without prediction may be indicated by a flag at a block level, a frame level, or a slice level. A slice may include a plurality of frames and a frame may include a plurality of blocks. A pre_srcc_size_flag flag at the block level may be used to indicate whether the size of the scan region of each block is coded with or without prediction. A pre_srcc_size_flag flag at the frame level may be used to indicate whether the sizes of all the scan regions in each frame are coded with or without prediction. A pre_srcc_size_flag flag at the slice level may be used to indicate whether the sizes of all the scan regions in all the frames of each slice are coded with or without prediction.

When the pre_srcc_size_flag flag is shared to indicate whether the sizes of the scan regions of luma and chroma components of each block are coded with or without prediction, separate context models may be used to code the luma and chroma components of each block, respectively. A pre_srcc_size_luma_flag flag may be used to indicate whether the sizes of the scan regions of a luma component of each block are coded with or without prediction. A pre_srcc_size_chroma_flag flag may be used to indicate whether the sizes of the scan regions of a chroma component of each block are coded with or without prediction.

In some embodiments, when a block is coded using SRCC method, there is at least one non-zero coefficient in the block. Thus, both SRx and SRy are positive. When a previously coded block in the decoding order preceding the current block does not include at least one non-zero coefficient and the block is determined to be the reference block for predicting the size of the scan region, the predicted SRx and SRy may be set to 1 (the minimum possible size), respectively.

Returning to FIG. 6, at S650, the current frame is coded to generate a bitstream including the coded residual block for each of the plurality of blocks of the current frame. After the residual block is transformed and quantized, the transformed and quantized residual block is entropy coded. The entropy coding algorithm may be Context-based Adaptive Binary Arithmetic Coding (CABAC). As a result of entropy coding, the bitstream including the entropy coded residual block is generated. The bitstream may be transmitted and/or stored. A video decoder may perform a video decoding method corresponding to the video encoding method consistent with the present disclosure to restore the original video.

Figure 10:
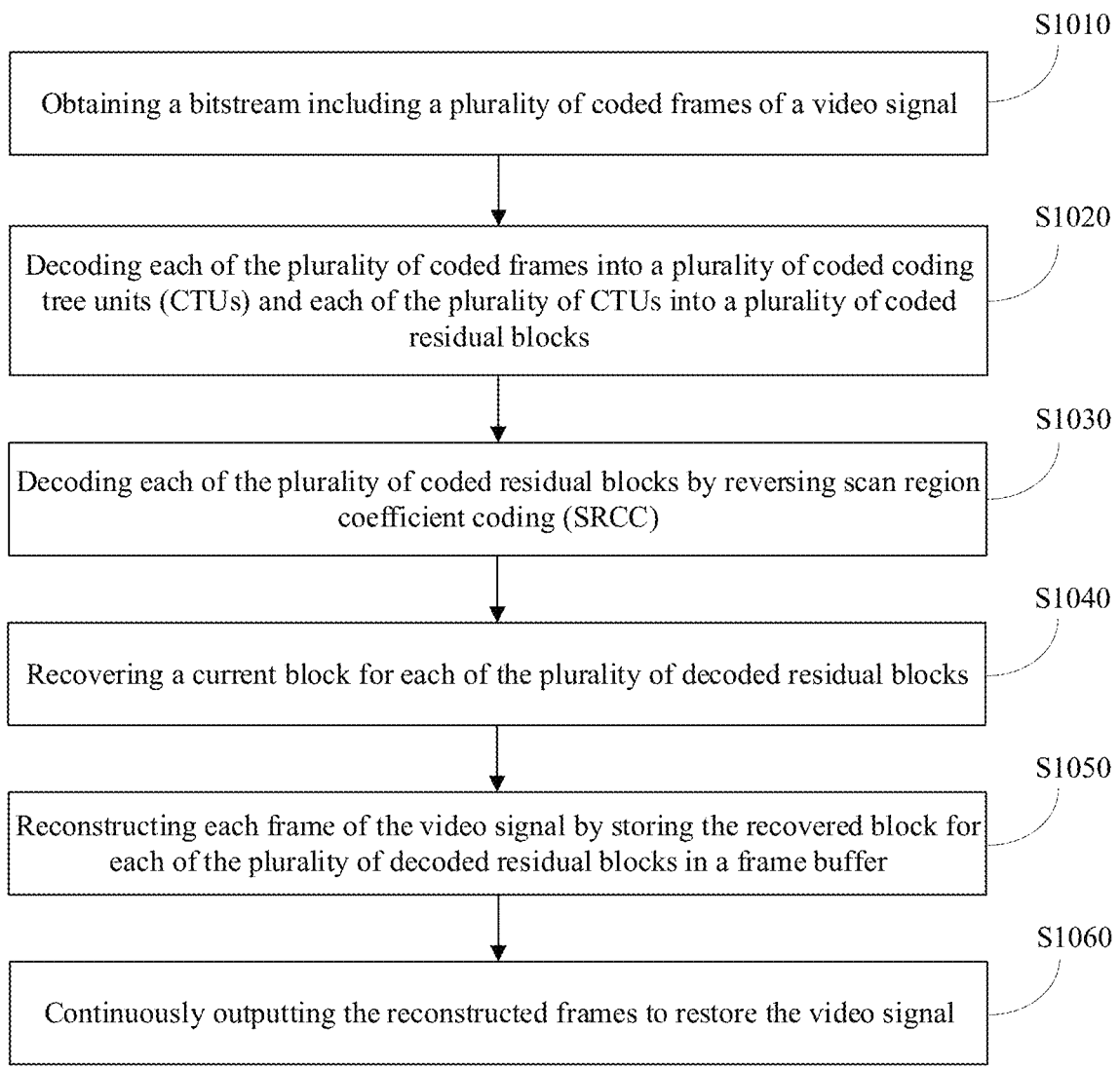
FIG. 10 illustrates an exemplary video decoding method consistent with embodiments of the present disclosure.

The present disclosure also provides a video decoding method. FIG. 10 illustrates an exemplary video decoding method consistent with embodiments of the present disclosure. As shown in FIG. 10, a bitstream including a plurality of coded frames of a video input is obtained (at S1010). The bitstream may be generated by the video encoder 400 in FIG. 4 performing the video encoding method in FIG. 6.

At S1020, each of the plurality of coded frames is decoded into a plurality of CTUs and each of the plurality of CTUs is decoded into a plurality of coded residual blocks. The bitstream includes header information to indicate the boundaries of the plurality of CTUs and the boundaries of the plurality of coded residual blocks contained in each of the plurality of CTUs. Each of the plurality of coded residual blocks may be entropy coded. An entropy decoding process followed by an inverse transform and inverse quantization process may be performed to obtain each of the plurality of residual blocks. The entropy decoding process and the inverse transform and inverse quantization process reverses the entropy coding process and the transform and the quantization process performed at S640 of the video encoding method shown in FIG. 6.

At S1030, each of the plurality of coded residual blocks is decoded by reversing SRCC. Specifically, the size of the scan region of a current block is predicted based on the sizes of the scan regions of previously coded blocks, for example, at S640 of the video encoding method shown in FIG. 6. Overhead bits for signaling whether the scan region is determined with or without prediction and the predicted size of the scan region at the block level, the frame level, or the slice level from the video encoder to the video decoder may be processed at the video decoder by reversing the method of predicting the size of the scan region performed at the video encoder. Because the operation principle of predicting the size of the scan region is similar at the video encoder and the video decoder, the detail description is omitted.

At S1040, the current block for each of the plurality of coded residual blocks is recovered. Specifically, recovering the current block from the decoded residual block includes obtaining a predicted block based on various prediction signals from the video encoder 400 in FIG. 4 performing the video encoding method in FIG. 6 and calculating the current block by adding the residual block and the predicted block.

At S1050, the recovered block for each of the plurality of decoded residual blocks in each of the plurality of CTUs is stored in a frame buffer to reconstruct each frame of the video signal. This process assembles a plurality of blocks into a CTU and a plurality of CTUs into a frame of the video signal by reversing S620 of the video encoding method in FIG. 6.

Finally, at S1060, the reconstructed frames are outputted continuously to restore the video signal. This process reverses S610 of the video encoding method in FIG. 6.

Figure 11:
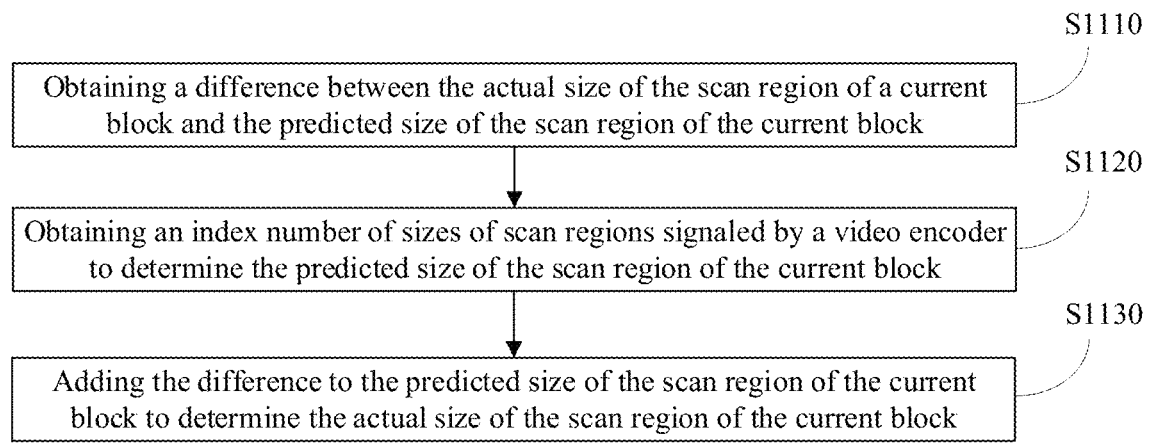
FIG. 11 illustrates an exemplary method of determining an actual size of a scan region of a current block based on a difference between the actual size and a predicted size and an index number of the predicted size consistent with embodiments of the present disclosure.

FIG. 11 illustrates an exemplary method of determining an actual size of a scan region of a current block based on a difference between the actual size and a predicted size and an index number of the predicted size consistent with embodiments of the present disclosure. As shown in FIG. 11, the difference between the actual size of the scan region of the current block and the predicted size of the scan region of the current block is obtained (at S1110). The difference between the actual size of the scan region of the current block and the predicted size of the scan of the current block is coded by the method of predicting the size of the scan region of the current block in FIG. 9.

At S1120, the index number of sizes of scan regions signaled by the video encoder 400 in FIG. 4 performing the video encoding method in FIG. 6 is obtained to determine the predicted size of the scan region of the current block.

Then, the difference obtained at S1110 is added to the predicted size of the scan region of the current block obtained at S1120 to determine the actual size of the scan region of the current block (at S1130). The actual size of the scan region of the current block may be used at S1030 of FIG. 10 to decode the residual block corresponding to the current block.

The embodiments of the video encoders and video decoders consistent with the present disclosure may be implemented by processing circuitry (e.g., one or more processors or one or more integrated circuits), which executes program instructions stored in a non-transitory computer-readable storage medium.

In various embodiments of the present disclosure, the video coding method supports SRCC and predicts the size of the scan region of the current block based on the sizes of the scan regions of previously coded blocks to reduce the overhead of signaling the size of the scan region of the current block. Thus, the coding efficiency and compression performance are improved.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A video encoding method, comprising:
obtaining a current frame of a video input;
dividing the obtained current frame into a plurality of blocks;

obtaining a residual block for each of the plurality of blocks;

performing scan region based coefficient coding (SRCC) to the residual block, wherein a size of a scan region of a current block is predicted based on the sizes of the scan regions of previously coded blocks; and coding the current frame to generate a bitstream including the coded residual block for each of the plurality of blocks of the current frame.

2. The method according to claim 1, wherein:

each block is a rectangular region within the current frame and has a width W and a height H, wherein W and H are positive integers;

the scan region of each block is a rectangular region within the block, wherein non-zero coefficients are located only within the scan region;

the upper-left corner of each scan region coincides with the upper-left corner of the corresponding block;

each scan region has a width SRx and a height SRy, wherein SRx is an integer between 1 and W of the corresponding block and SRy is an integer between 1 and H of the corresponding block; and the size of the scan region defined by SRx and SRy for each previously coded block is stored and identified by an index number, wherein the index number is an integer greater than or equal to 0.

3. The method according to claim 1, wherein:

a pre_srcc_size_flag flag is used to indicate whether the size of the scan region of each block, all blocks in each frame, or all frames in each slice is coded with or without prediction.

4. The method according to claim 3, wherein when the size of the scan region of a current block is coded with prediction, predicting the size of the scan region of the current block includes:

determining a reference block among previously coded blocks;

determining the size of the scan region of the reference block as a predicted size of the scan region of the current block;

using the index number of the scan region of the reference block to signal the predicted size of the scan region of the current block; and coding a difference between the actual size of the scan region of the current block and the predicted size of the scan region of the current block.

5. The method according to claim 4, wherein when the predicted size of the scan region of the current block is limited to no more than the actual size of the scan region of the current block, coding the difference between the actual size of the scan region of the current block and the predicted size of the scan region of the current block includes:

coding a difference between the actual width of the scan region of the current block and the predicted width of the scan region of the current block; and coding a difference between the actual height of the scan region of the current block and the predicted height of the scan region of the current block.

6. The method according to claim 4, wherein when the predicted size of the scan region of the current block is not limited to no more than the actual size of the scan region of the current block, coding the difference between the actual size of the scan region of the current block and the predicted size of the scan region of the current block includes:

coding a width sign flag and an absolute difference between the actual width of the scan region of the current block and the predicted width of the scan region of the current block; and coding a height sign flag and an absolute difference between the actual height of the scan region of the current block and the predicted height of the scan region of the current block.

7. The method according to claim 4, wherein the reference block is:

the most recently coded block;

the most recently coded block having a same area as the current block;

the most recently coded block having a same width and a same height as the current block;

the most recently coded block falling into a same pre-defined category as the current block, wherein the pre-defined category includes the blocks having the area within a certain range; or one of the neighboring blocks adjacent to the current block.

8. The method according to claim 4, wherein the predicted size of the scan region of the current block is determined by:

averaging the sizes of the scan regions for a pre-defined number of previously coded blocks preceding the current block; and determining the averaged size as the predicted size of the scan region of the current block.

9. The method according to claim 4, wherein the predicted size of the scan region of the current block is determined by:

determining a most used size of the scan region among the pre-defined number of previously coded blocks preceding the current block; and determining the most used size as the predicted size of the scan region of the current block.

10. The method according to claim 1, wherein:

the plurality of blocks include luma blocks and chroma blocks;

the size of the scan region of a current luma block is predicted based on the sizes of the scan regions of previously coded luma blocks; and the size of the scan region of a current chroma block is predicted based on the sizes of the scan regions of previously coded chroma blocks.

11. The method according to claim 10, wherein:

when the pre_srcc_size_flag flag is shared to indicate whether the sizes of the scan regions of luma and chroma components of each block are coded with or without prediction, separate context models are used to code the luma and chroma components of each block, respectively;

a pre_srcc_size_luma_flag flag is used to indicate whether the sizes of the scan regions of a luma component of each block are coded with or without prediction; and a pre_srcc_size_chroma_flag flag is used to indicate whether the sizes of the scan regions of a chroma component of each block are coded with or without prediction.

12. A video decoding method, comprising:

obtaining a bitstream including a plurality of coded frames of a video signal;

decoding each of the plurality of coded frames into a plurality of coded coding tree units (CTUs) and each of the plurality of coded CTUs into a plurality of coded residual blocks;

decoding each of the plurality of coded residual blocks by reversing scan region based coefficient coding (SRCC), wherein a size of a scan region of a current block is predicted based on sizes of scan regions of previously coded blocks;

recovering the current block for each of the plurality of decoded residual blocks;

reconstructing each frame of the video signal by storing the recovered block for each of the plurality of decoded residual blocks in a frame buffer; and continuously outputting the reconstructed frames to restore the video signal.

13. The method according to claim 12, wherein:

each block is a rectangular region within the current frame and has a width W and a height H, wherein W and H are positive integers;

the scan region of each block is a rectangular region within the block, wherein non-zero coefficients are located only within the scan region;

the upper-left corner of each scan region coincides with the upper-left corner of the corresponding block;

each scan region has a width SRx and a height SRy, wherein SRx is an integer between 1 and W of the corresponding block and SRy is an integer between 1 and H of the corresponding block; and the size of the scan region defined by SRx and SRy for each previously coded block is stored and identified by an index number, wherein the index number is an integer greater than or equal to 0.

14. The method according to claim 12, wherein:

a pre_srcc_size_flag flag is used to indicate whether the size of the scan region of each block, all blocks in each frame, or all frames in each slice is coded with or without prediction.

15. The method according to claim 14, wherein when the size of the scan region of a current block is coded with prediction, predicting the size of the scan region of the current block includes:

determining a reference block among previously coded blocks;

determining the size of the scan region of the reference block as a predicted size of the scan region of the current block;

using the index number of the scan region of the reference block to signal the predicted size of the scan region of the current block; and coding a difference between the actual size of the scan region of the current block and the predicted size of the scan region of the current block.

16. The method according to claim 15, wherein when the predicted size of the scan region of the current block is limited to no more than the actual size of the scan region of the current block, coding the difference between the actual size of the scan region of the current block and the predicted size of the scan region of the current block includes:

coding a difference between the actual width of the scan region of the current block and the predicted width of the scan region of the current block; and coding a difference between the actual height of the scan region of the current block and the predicted height of the scan region of the current block.

17. The method according to claim 15, wherein when the predicted size of the scan region of the current block is not limited to no more than the actual size of the scan region of the current block, coding the difference between the actual size of the scan region of the current block and the predicted size of the scan region of the current block includes:

coding a width sign flag and an absolute difference between the actual width of the scan region of the current block and the predicted width of the scan region of the current block; and coding a height sign flag and an absolute difference between the actual height of the scan region of the current block and the predicted height of the scan region of the current block.

18. The method according to claim 15, wherein the reference block is:

the most recently coded block;

the most recently coded block having a same area as the current block;

the most recently coded block having a same width and a same height as the current block;

the most recently coded block falling into a same pre-defined category as the current block, wherein the pre-defined category includes the blocks having the area within a certain range; or one of the neighboring blocks adjacent to the current block.

19. The method according to claim 15, wherein the predicted size of the scan region of the current block is determined by:

averaging the sizes of the scan regions for a pre-defined number of previously coded blocks preceding the current block; and determining the averaged size as the predicted size of the scan region of the current block.

20. The method according to claim 15, wherein the predicted size of the scan region of the current block is determined by:

determining a most used size of the scan region among the pre-defined number of previously coded blocks preceding the current block; and determining the most used size as the predicted size of the scan region of the current block.

* * * * *